(12) United States Patent
Venkataramu et al.

(10) Patent No.: US 9,203,842 B2
(45) Date of Patent: Dec. 1, 2015

(54) ESTABLISHING CONNECTIONS FOR SECURE ELEMENT COMMUNICATIONS (71) Applicant: Cellco Partnership, Basking Ridge, NJ (US)

(72) Inventors: Praveen Venkataramu, Bridgewater, NJ (US); Ruben Cuadrat, New York, NY (US); Manuel Enrique Caceres, Basking Ridge, NJ (US); James A. Xanthos, Fulton, MD (US)

(73) Assignee: Cellco Partnership, Basking Ridge, NJ (US)

( * ) Notice: Subject to any disclaimer, the term of this patent is extended or adjusted under 35 U.S.C. 154(b) by 62 days.

(21) Appl. No.: 14/149,253

(22) Filed: Jan. 7, 2014

(65) Prior Publication Data
US 2015/0195281 A1 Jul. 9, 2015

(51) Int. Cl.
*H04L 9/32* (2006.01)
*H04L 29/06* (2006.01)
(52) U.S. Cl.
CPC .................................. *H04L 63/0884* (2013.01)
(58) Field of Classification Search
CPC ..... H04L 63/08; H04L 63/0869; H04L 63/12; H04L 63/16; H04L 63/166; H04L 63/20; G06F 21/31; G06F 21/42; G06F 21/445; G06F 21/30; G06Q 20/382; G06Q 20/388; G06Q 20/4097; G06Q 20/40975
USPC .............. 726/2–7, 27–30; 713/168–170, 182, 713/193; 705/50, 64
See application file for complete search history.

(56) References Cited

U.S. PATENT DOCUMENTS

| | | | | |
|---|---|---|---|---|
| 8,181,262 | B2* | 5/2012 | Cooper et al. | 726/28 |
| 8,875,228 | B2* | 10/2014 | Gargiulo et al. | 726/1 |
| 8,984,648 | B2* | 3/2015 | Marcovecchio et al. | 726/26 |
| 2013/0198086 | A1* | 8/2013 | Mardikar | 705/71 |

* cited by examiner

*Primary Examiner* — Hosuk Song (57) ABSTRACT

A server is configured to establish connections for secure element communication sessions. The server receives a request from a device to establish a first secure connection, and establishes the first secure connection with the device in response to the received request. The server sends a request to a Trusted Service Manager (TSM). The sent request instructs the TSM to establish a second secure connection between the TSM and a secure memory. The server receives an authentication request from the TSM to establish the second secure connection, and forwards the authentication request to the device over the first secure connection.

24 Claims, 9 Drawing Sheets

ESTABLISHING CONNECTIONS FOR SECURE ELEMENT COMMUNICATIONS

BACKGROUND

The use of devices to make secure and convenient transactions is expected to grow and present new opportunities to users and providers of services and applications. Providing trusted channels for transactions relies upon the collaboration between a variety of parties, including Mobile Network Operators (MNOs), financial institutions, service providers, and end users. Because the number of parties in the mobile transaction ecosystem can be large, a secure network entity called a Trusted Service Manager (TSM) can facilitate interactions between the various parties, and specifically act as a trusted element for provisioning and personalization of information on a secure memory. For example, a TSM can remotely initialize a secure memory, for example, a so called Secure Element (SE), which is one type of a protected integrated storage and execution platform installed within the device, so the user may, for example, safely transact with the appropriate parties for goods and services. This initialization can include provisioning the SE with secure applications and/or cryptographic data. Conventional provisioning approaches may use the Simple Message Service (SMS) as a primary push mechanism to establish communication sessions between the TSM and the SE. However, SMS messaging may be inconsistent and unreliable, and can introduce significant latencies in message delivery.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein facilitate the establishment of secure communications for performing mobile transactions. These mobile transactions, which may be conveniently initiated through a device, can include trusted exchanges between one or more service providers and a user of the device. The trusted exchanges can include transactions for any type of good and/or service, which may involve retail stores, banks, credit card companies, loyalty/rewards programs, entertainment providers, restaurants, and/or public and private travel services. The trusted exchanges may also be used in environments employing physical security measures, therefore allowing users with the properly provisioned devices access to secure areas in office buildings, homes, laboratories, vehicles, etc. In order to promote ease of use, the device may employ Near Field Communications (NFC) functionality to wirelessly communicate with an NFC reader. Alternatively, other embodiments may use other types of Personal Area Networks, such as, for example, Bluetooth® Low Energy, to easily exchange data for transactions.

In order to initialize a device for performing trusted exchanges with service providers, the device may be provided with security information by a Trusted Service Manager (TSM). Because the security information is sensitive, it should be provided over a secure connection from the TSM to a secure memory, such as, for example, a Secure Element (SE). The SE, as will be discussed below, is a trusted component typically housed within the device. To maintain security, the secure connection between the SE and TSM is established by the SE upon receiving an "authentication request" (also referred to herein a "wakeup trigger"). The mechanisms for providing the authentication requests may be based upon client initiated actions (referred to herein as "client triggered") or predicated upon actions initiated by a server (referred to herein as "server triggered"). For embodiments described below, the authentication request may be provided by a different secure connection previously established between the device and another network entity. Thus, the previously established secure connection, which can use protocols having low latency and high reliability, is used as a primary connection for authentication requests instead of the conventional approach of sending the authentication request via SMS messaging. However, is some embodiments, conventional SMS messaging may be used as a secondary approach (e.g., as a backup) for sending authentication requests if the previously established secure connection is unavailable.

Figure 1:
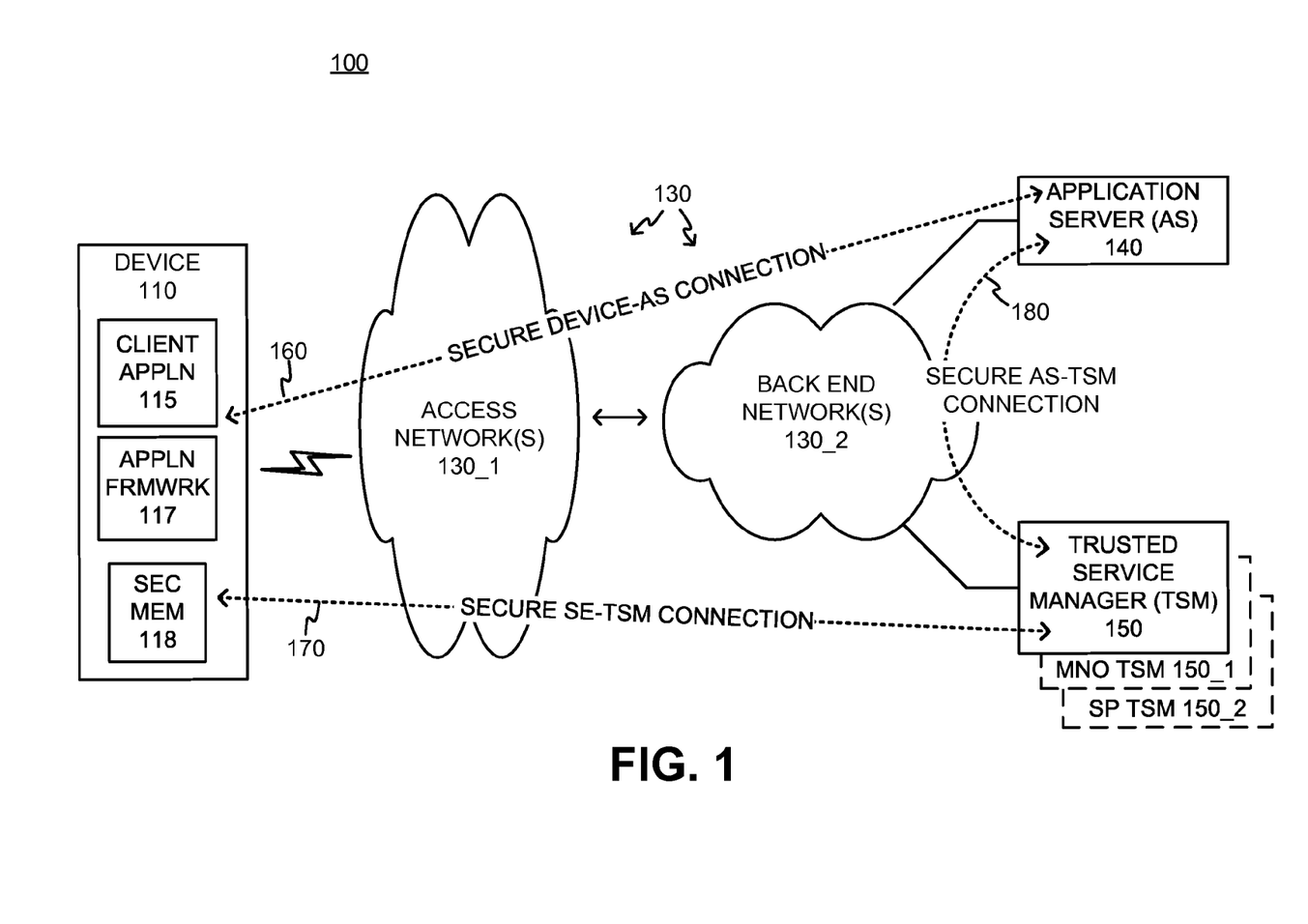
FIG. 1 is a block diagram of an exemplary environment for establishing secure connections between entities engaging in mobile transactions.

FIG. 1 is a block diagram showing an exemplary environment 100 for establishing secure connections between entities engaging in a mobile transactions. The environment may include a device 110, an Application Server (AS) 140, and a Trusted Service Manager (TSM) 150 (which may further include one or more Mobile Network Operator (MNO) TSM 150_1, and one or more Service Provider (SP) TSM 150_2). Device 110, AS 140 and TSM 150 may be interconnected by a plurality of networks 130 to provide communications over a variety of different connections, which include secure connections for facilitating trusted exchanges. For ease of explanation, only one device 110, AS 140, and TSM 150, MNO TSM 150_1, and SP TSM 150_2 are illustrated as being connected to networks 130. However, it should be understood that a plurality of devices 110, ASs 140, and/or TSMs 150, or other known network entities, may be communicatively coupled to networks 130.

Networks 130 may include a plurality of networks of any type, and may be broadly grouped into one or more access network(s) 130_1 and one or more back end network(s) 130_2. Access network(s) 130_1 provides connectivity between device 110 and other network elements within access network(s) 130_1 and/or back end network(s) 130_2.

Access network(s) 130_1 may include, for example, a telecommunications network (e.g., a Public Switched Telephone Network (PSTN)), wired (e.g., Ethernet) and/or wireless local area network(s) (LAN) (e.g., WiFi), wireless wide area networks (WAN) (e.g., WiMax), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Back end network(s) 130_2 may exchange data with access network(s) 130_1 to provide device 110 connectivity to various servers, gateways, and other network entities, which may include one or more Application Server(s) 140 and one or more trusted service manager(s) 150. Back end network(s) 130_2 may include a wide area network (WAN), a metropolitan area network (MAN), an intranet, the Internet, a wireless satellite network, a cable network (e.g., an optical cable network).

Device 110 may include any type of electronic device having communication capabilities, and thus communicate over networks 130 using a variety of different channels, including both wired and wireless connections. Device 110 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms).

Device 110 may further include one or more client applications 115, an application framework 117, and a secure memory 118. Secure memory 118 can provides a trusted and compartmentalized storage and execution environment, and securely stores cryptographic data as well as programs from various service providers. In some implementations, secure memory 118 may include a secure element (SE) 119, a Trusted Execution Environment (TEE), or other devices capable of providing secure storage and/or program execution. In embodiments presented below, a SE 119 is shown, however any type of secure memory may also be used.

Client application 115 may execute on the device 110, and provide a user interface for interacting with a particular service provider. For example, client application 115 may be a "wallet client" associated with credit cards and/or debit card applications. Client application 115 may use application framework 117 to access various resources provided by device 110. For example, through application framework 117, client application 115 may communicate with other entities, both within device 110, and with external network entities over one or more network in networks 130. For example, through application framework 117, client application 110 may communicate with application server 140 over a secure device-AS connection 160 supported by access network(s) 130_1. Application framework 117 may also be used as an interface between client application 115 and SE 119, which in this embodiment is an internal component residing in device 110.

SE 119 is a tamper resistant platform which may be embodied in a single chip secure microcontroller. SE 119 is capable of securely storing applications (hereinafter referred to as "secure applications") and cryptographic data (such as, for example, secure keys). The secure information stored in SE 119 may be managed in accordance with rules and security requirements provided by established trusted authorities. SE 119 may communicate with TSM 150 using access networks 130_1 over a secure SE-TSM connection 170 which supports Bearer Independent Protocol (BIP) sessions. BIP sessions permit the SE and TSM to communicate independently of the physical transportation layers which support secure SE-TSM connections 170. BIP is a mechanism by which device 110 provides the SE 119 access to the data bearers supported by the device, which include bearers associated with local area networks (e.g., Bluetooth®, IrDA, etc.) and/or wide area networks (e.g., GPRS, 3G, HS×PA, HSPA+, LTE, etc.). Specifically, BIP is designed to make use of any IP based connection that device 110 is capable of establishing. Once a BIP session is established, Global Platform (GP) commands/payloads may be securely exchanged between SE 119 and TSM 150. It is noted that access network(s) 130_1 can be one type of network, or a plurality of networks using different protocols, air channels, etc. which may be used independently and can be different for secure device-AS connection 160 and secure SE-TSM connection 170. For example, secure device-AS connection 160 may be established over a WiFi connection, where secure SE-TSM connection 170 may be established over a cellular (e.g., LTE) connection.

TSM 150 may be a server having functions which include accessing and managing SE 119 for provisioning operations, which can include operations of maintenance, personalization, instantiation, etc. Security is maintained since SE 119 only accepts secure applications/data from authorized TSMs 150. Accordingly, TSM 150 may be thought of as a trusted intermediary designed to assist service providers and securely distribute and manage secure applications and cryptographic data for their customers using the Mobile Network Operators (MNO) networks. TSM 150 does not necessarily participate in the actual transactions between device 110 and a service provider, as these transactions are processed by systems previously established by the service provider and its merchant partners. Instead, TSM 150 may act as a neutral entity that enables service providers to distribute and manage their secure applications remotely by allowing access to the secure storage and processing resources within SE 119. In summary, the functions of TSM 150 may include: issuing and managing a trusted execution environment in the SE; assigning trusted areas within a trusted execution environment to a specific service; managing keys for a trusted execution environment; safely downloading secure applications into the SE; personalizing applications; and locking, unlocking, and deleting secure applications according to the request of a user or a service provider. While only one TSM 150 is shown in FIG. 1, environment 100 may have a number of different TSMs operated by different organizations. For example, the MNO may have its own TSM within its network (hereinafter referred to as an "MNO TSM"), which may manage SE lifecycles and security domains for service providers. Additionally, service providers may also have their own TSMs (hereinafter referred to "SP TSMs") which may manage the provisioning and lifecycles of the service provider's secure application and cryptographic key data.

AS 140 may be a server that manages applications which may reside on the device 110. AS 140 may communicate with device 110 over access network(s) 130_1 using secure device-AS connection 160. Additionally, AS 140 may communicate with TSM 150 over back end network 130_2 using a secure AS-TSM connection 180. While only one Application Server (AS 140) is shown in FIG. 1, in various embodiments, multiple application servers may be associated with different entities and used within environment 100. For example, an application server may be associated with the MNO (hereinafter referred to as an "MNO AS"). An MNO AS may provide client applications 115 to device 110, which reside within the memory and execute on the processor of device 110. For example, an MNO AS may provide a "wallet application" which may be used as an electronic wallet to provide a user interface to manage various services associated with digital equivalent of credit cards, debit cards, loyalty cards, etc. Additionally, service providers may also be associated with their own application servers, which may be referred to herein as an "SP AS." An SP AS may serve as a repository for secure applications which may run on SE 119. The secure applications may be provided by an SP AS to an SP TSM, over secure AS-TSM connection 180, for subsequent provisioning onto SE 119 by SP TSM over secure SE-TSM connection 170. Note that the SP AS cannot provision the secure application to SE 119, as only an authorized TSM may perform this function.

Further referring to FIG. 1, the following embodiment provides a mechanism to establish a secure SE-TSM connection 170 over access network(s) 130_1, which may be triggered by the user through client application 115, or triggered by a remote server such as a TSM 150. This embodiment maintains the desired security of the contents of SE 119, and is motivated by the permitted interactions between SE 119, AS 140, and TSM 150. The permissible interactions are as follows:

1) The SE only performs operations provided by an authorized TSM.

2) Client application 115 provides the user with a service typically by requesting SE 119 to perform a secure service involving sensitive information (e.g., make a payment). Client application 115 can use SE 119 to perform some limited operations related to content change which involve non-sensitive data. However, client application 115 may not perform any functional change or personalization of sensitive data (e.g., account numbers). Changing a secure application and/or sensitive data may only be performed by TSM 150 via secure SE-TSM connection 170 interactions.

Given the context of the permissible interactions provided above, the following approach may be used to establish a secure SE-TSM connection 170. Client application 115 may establish a secure Device-AS connection 160 with AS 140 through application framework 117. This may be done by requesting a service utilizing secure information (e.g., add a credit card). AS 140 may then request TSM 150 to generate an authentication request for establishing a secure connection with SE 119. TSM may forward the authentication request back to AS 140 over secure AS-TSM connection 180. AS 140 may forward the authentication request, over the established secure Device-AS connection 160, to application framework 117. Note that it is this previously established secure connection, rather than a conventional SMS messaging connection, which may be used as the primary connection to provide an authentication request to device 110. In alternative embodiments, SMS messaging may be used as backup connection if other connections for forwarding the authentication request are unavailable. Application framework 117 then forwards the authentication request to SE 119. The SE 119 may then establish secure SE-TSM connection 170 with TSM 150.

Accordingly, the authentication request may be sent over a secure connection (secure Device-AS connection 160) which has already been established, thus leveraging an existing connection which does not have the latency or reliability issues associated with the conventional approach of using an SMS wakeup trigger as described above.

Figure 2:
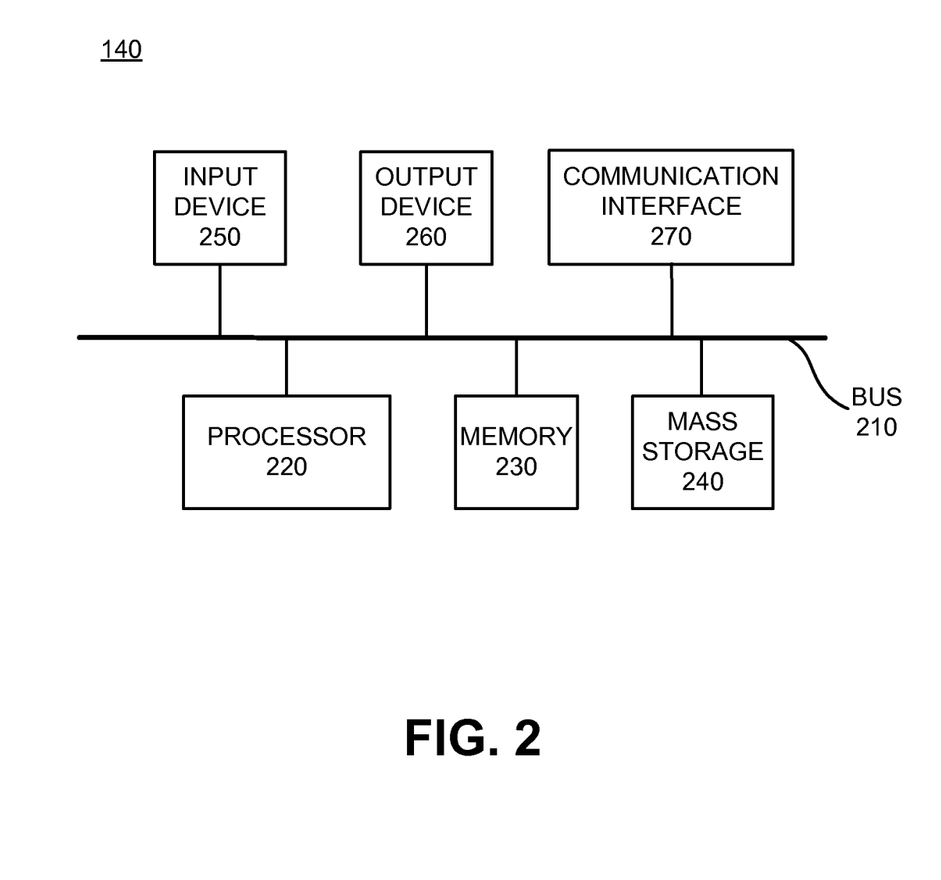
FIG. 2 is a block diagram depicting exemplary components of an application server according to an embodiment.

FIG. 2 is a block diagram depicting exemplary components of Application Server (AS) 140. AS 140 may include a bus 210, a processor 220, a memory 230, mass storage 240, an input device 250, an output device 260, and a communication interface 270.

Bus 210 includes a path that permits communication among the components of server 140. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. For example, the processor 220 may be an x86 based CPU, and may use any operating system, which may include varieties of the Windows, UNIX, and/or Linux. The processor 220 may also use high-level analysis software packages and/or custom software written in any programming and/or scripting languages for interacting with other network entities and providing applications to a plurality of devices 110 which are communicatively coupled to networks 130.

Memory 230 may include any type of dynamic storage device that may store information and/or instructions, for execution by processor 220, and/or any type of non-volatile storage device that may store information for use by processor 220. For example, memory 230 may include a RAM or another type of dynamic storage device, a ROM device or another type of static storage device, and/or a removable form of memory, such as a flash memory. Mass storage device 240 may include any type of on-board device suitable for storing large amounts of data, and may include one or more hard drives, solid state drives, and/or various types of RAID arrays. Mass storage device 240 would be suitable for storing files associated client applications for distribution to a plurality of devices 110.

Input device 250, which may be optional, can allow an operator to input information into administration sever 110, if required. Input device 250 may include, for example, a keyboard, a mouse, a pen, a microphone, a remote control, an audio capture device, an image and/or video capture device, a touch-screen display, and/or another type of input device. In some embodiments, AS 140 may be managed remotely and may not include input device 250. Output device 260 may output information to an operator of AS 140. Output device 260 may include a display (such as an LCD), a printer, a speaker, and/or another type of output device. In some embodiments, server 140 may be managed remotely and may not include output device 260.

Communication interface 270 may include a transceiver that enables AS 140 to communicate over networks 130 with other devices and/or systems. The communications interface 270 may be a wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 270 may include a transmitter that converts baseband signals to RF signals and/or a receiver that converts RF signals to baseband signals. Communication interface 270 may be coupled to one or more antennas for transmitting and receiving RF signals. Communication interface 270 may include a logical component that includes input and/or output ports, input and/or output systems, and/or other input and output components that facilitate the transmission/reception of data to/from other devices. For example, communication interface 270 may include a network interface card (e.g., Ethernet card) for wired communications and/or a wireless network interface (e.g., a WiFi) card for wireless communications. Communication interface 270 may also include a USB port for communications over a cable, a Bluetooth® wireless interface, an RFID interface, an NFC wireless interface, and/or any other type of interface that converts data from one form to another form.

As described below, AS 140 may perform certain operations relating to establishing a secure SE-TSM connection 170 over access network(s) 130_1. AS 140 may perform these operations in response to processor 220 executing software instructions contained in a computer-readable medium, such as memory 230 and/or mass storage 240. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of AS 140, in other implementations, AS 140 may include fewer components, different components, additional components, or differently arranged components than depicted in FIG. 2.

Figure 3A:
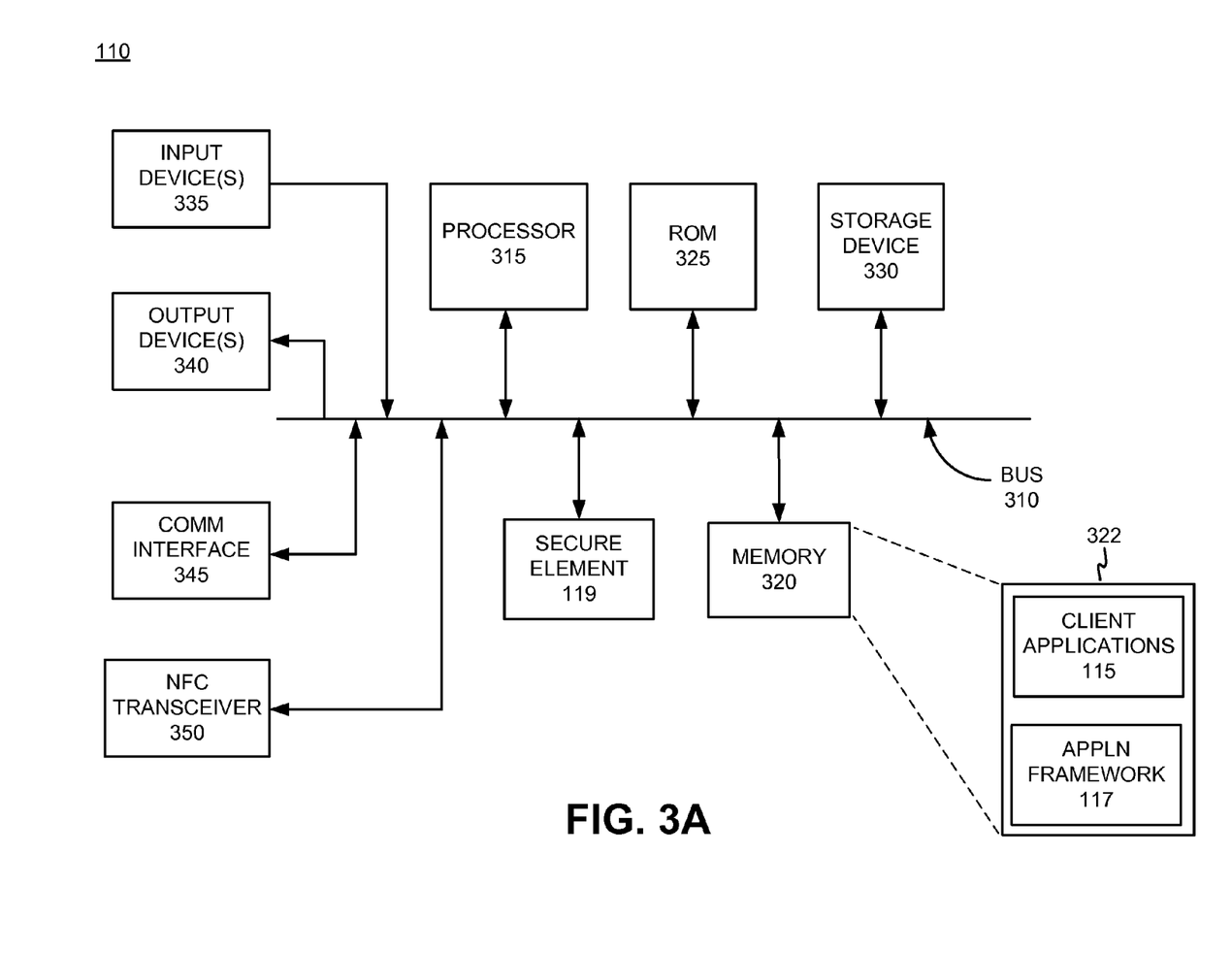
FIG. 3A is a block diagram showing exemplary components of a device according to an embodiment.

FIG. 3A is a block diagram showing exemplary components of a device 110 according to an embodiment. Device 110 may include a bus 310, a processor 315, memory 320, a read only memory (ROM) 325, a storage device 330, an input device(s) 335, an output device(s) 340, a communication interface 345, a Near Field Communications (NFC) transceiver 350, and Secure Element (SE) 119. Bus 310 may include a path that permits communication among the elements of device 110. SE 119 may be inserted into a secure element interface (I/F) (e.g., a smart card or Subscriber Identifier Module (SIM) card interface) of device 110.

Processor 315 may include a processor, microprocessor, or processing logic that may interpret and execute instructions. Memory 320 may include a random access memory (RAM) or another type of dynamic storage device that may store information and instructions for execution by processor 315. ROM 325 may include a ROM device or another type of static storage device that may store static information and instructions for use by processor 315. Storage device 330 may include a magnetic and/or optical recording medium and its corresponding drive.

Input device(s) 335 may include one or more mechanisms that permit an operator to input information to device 110, such as, for example, a keypad or a keyboard, a microphone, voice recognition and/or biometric mechanisms, etc. Output device(s) 340 may include one or more mechanisms that output information to the operator, including a display, a speaker, etc. Communication interface 345 may include any transceiver mechanism that enables device 110 to communicate with other devices and/or systems. For example, communication interface 345 may include mechanisms for communicating with another device or system via a network, such as networks 130. A Near Field Communications (NFC) transceiver 350 may interface with bus 310 to permit device 110 to exchange data with NFC readers, thus allowing convenient transactions with appropriately equipped Point of Sale terminals, kiosks, building security gateways, etc. Secure Element 119 may be insertable into device 110 via a smart module I/F, which may store secure applications and data to permit device 110 to perform trusted exchanges with other network entities. SE 119 may include, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM).

Device 110 may perform certain operations or processes, as may be described in detail below. Device 110 may perform these operations in response to processor 315 executing software instructions contained in a computer-readable medium, such as memory 320. A computer-readable medium may be defined as a physical or logical memory device. A logical memory device may include memory space within a single physical memory device or spread across multiple physical memory devices. Memory may further include a memory space 322 which stores client applications 115 and application framework 117. Client applications 115 may be provided by an MNO Application Server as described above. Application framework 117 permits client applications 115 to utilize resources of device 110, and further to interface with SE 119.

The software instructions may be read into memory 320 from another computer-readable medium, such as storage device 330, or from another device via communication interface 345. The software instructions contained in memory 320 may cause processor 315 to perform operations or processes that will be described in detail with respect to FIG. 8. Alternatively, hardwired circuitry may be used in place of or in combination with software instructions to implement processes consistent with the principles of the embodiments. Thus, exemplary implementations are not limited to any specific combination of hardware circuitry and software.

The configuration of components of device 110 illustrated in FIG. 3A is for illustrative purposes only. It should be understood that other configurations may be implemented. Therefore, device 110 may include additional, fewer and/or different components than those depicted in FIG. 3A.

Figure 3B:
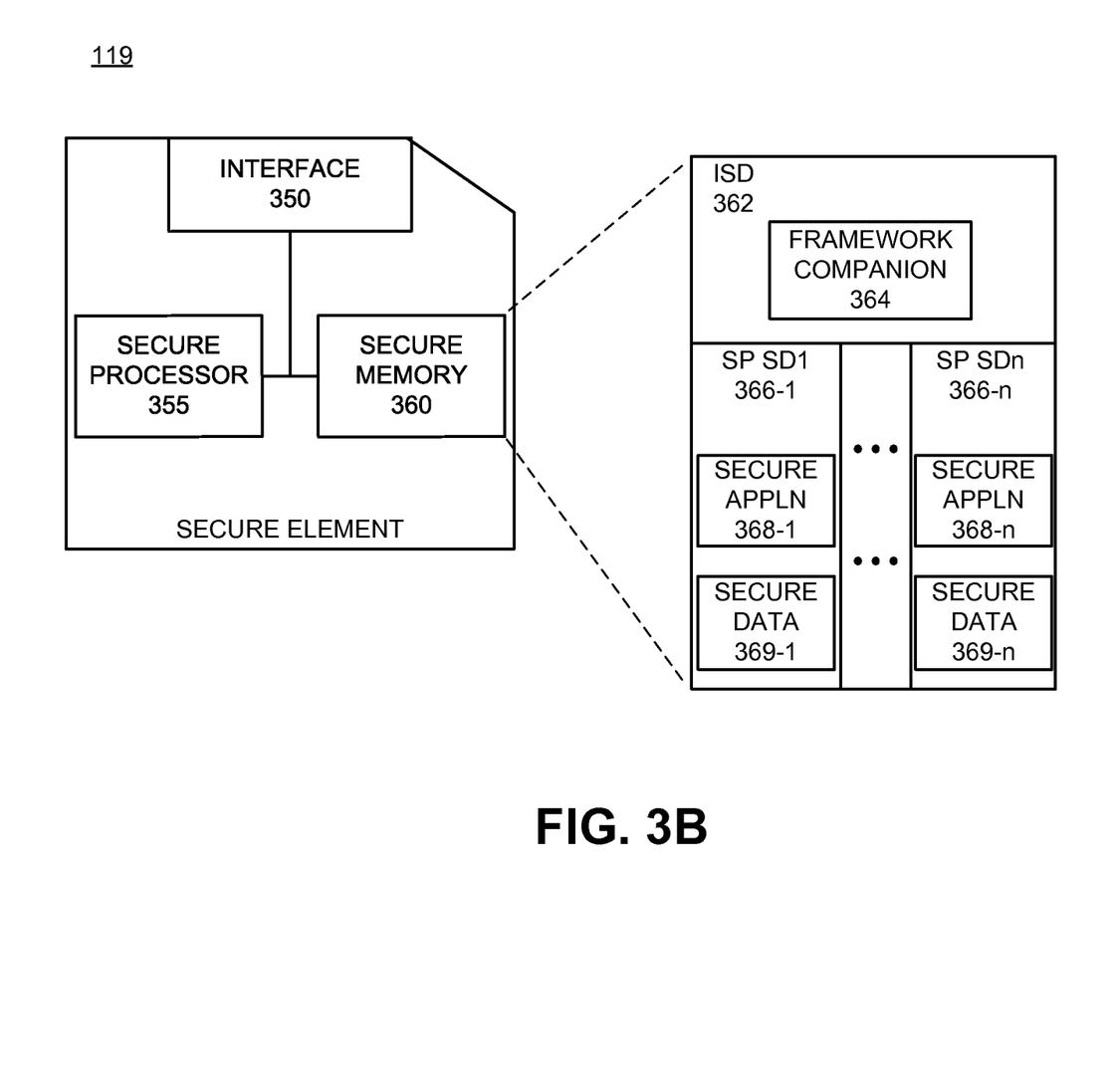
FIG. 3B is a block diagram showing exemplary components and a memory layout of a secure element according to an embodiment.

FIG. 3B is a block diagram showing exemplary components with Secure Element (SE) 119 and an associated secure memory layout according to an embodiment. SE 119 is the component in device 110 providing the security and confidentiality required to support trusted exchanges among various network entitles over networks 130. In general, SE 119 is a tamper-resistant platform (e.g., a single-chip secure microcontroller) capable of securely hosting applications and their associated confidential and/or cryptographic data (e.g., key management) in accordance with the rules and security requirements set forth by a set of well-identified trusted authorities. The common form factors of SE 119 may include Universal Integrated Circuit Card (UICC), embedded SE, and microSD, where the UICC and microSD may be removable. SE 119 may include a secure processor 355, a secure memory 360, and an interface 350.

Interface 350 may include circuitry for inputting data to SE 119 from device 110, and output circuitry for outputting data from SE 119 to device 110. Secure processor 355 may include a processor, microprocessor, or processing logic that may interpret and execute instructions stored in secure memory 360. For example, secure processor 355 may interpret and execute instructions an application received from a service provider TSM. Memory 360 may include RAM, ROM, and/or Electrically Erasable Programmable Read-Only Memory (EEPROM). Secure memory 360 may further be organized according to various security domains to ensure sensitive information remains compartmentalized, and cannot be shared between different service providers or the MNO. Specifically, according to Global Platform guidelines, a number of different security domains can be established such that each organization is associated with its own security domain. The MNO may be associated with an Issuer Security Domain (ISD) 362. The ISD 362 may store a framework companion 364 which includes instructions for interfacing with application framework 117 which executes on processor 315 in mobile device 110. Additionally, ISD 362 may include a set of default keys set by the SE manufacturer.

Secure memory 360 may further include compartmentalized memory areas called service provider security domains which may be associated with each service provider for which device 110 transacts. Thus, each service provider is associated with a different security domain, SP SD1 366-1 through SP SD 366-n (generically and individually referred to herein as "SP SD 366"). Each security domain SP SD 366 has its own separate memory store for secure data 369-1 through 369-n (generically and individually referred to herein as "369") which may store sensitive information such as account numbers and/or cryptographic keys which are only known to the respective service provider. Additionally, each security domain SP SD 366 may have its own separate memory store 368-1 through 368-n (generically and individually referred to herein as "368") for secure application(s) associated with each service provider.

The secure applications may run on secure processor 355, which maintains separation from processor 315 of mobile device 110 for security. Accordingly, each service provider may cipher/authenticate a payload with the cryptographic keys personalized for its security domain. Only applications on the security domain associated with the service provider are able to decipher its respective payload. Secure applications 368 may include, for example, credit card applications, debit card applications, loyalty program applications, ticketing applications, building access applications, and travel applications.

When SE 119 undergoes a provisioning/personalization process for a specific service provider, the SE 119 is loaded with the appropriate secure application and sensitive data, such as account numbers and/or cryptographic keys, into the appropriate SP SD 366. This provisioning may provided over the air using the established secure SE-TSM connection 170 during a BIP session.

SE 119 may perform certain operations or processes, as may be described in detail below in relation to FIG. 8. SE 119 may perform these operations in response to secure processor 355 executing software instructions contained in a computer-readable medium, such as secure memory 360. Alternatively, hardwired circuitry may be used in place of or in combination with software instructions to implement processes consistent with the principles of the embodiment. Thus, exemplary implementations are not limited to any specific combination of hardware circuitry and software.

The configuration of components of SE 119 illustrated in FIG. 3B is for illustrative purposes only. It should be understood that other configurations may be implemented. Therefore, SE 119 may include additional, fewer and/or different components than those depicted in FIG. 3B.

Figure 4:
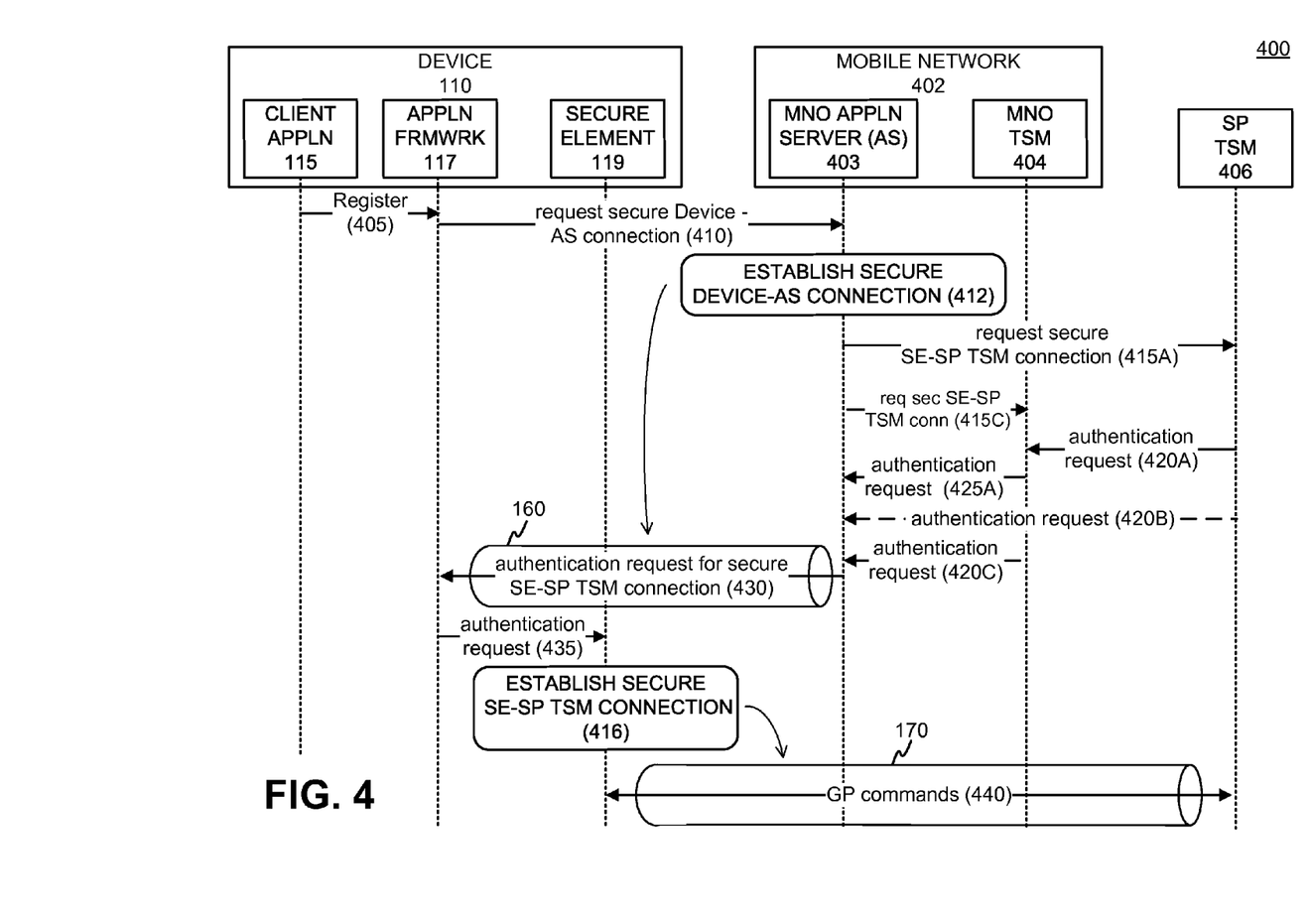
FIG. 4 is an exemplary call flow diagram illustrating communications between network entities for establishing a secure connection between a Secure Element (SE) and a Trusted Service Manager (TSM)

FIG. 4 is an exemplary call flow diagram 400 illustrating communications between network entities for establishing a secure connection between Secure Element (SE) 119 and service provider Trusted Service Manager (SP TSM) 406, which may be triggered by client application 115 on device 110. As shown, within Device 110, client application 115 may send a Register request to Application Framework 117 (405). The Register request may be the result of locally triggered event initiated by the user who wishes to perform a service operation (e.g., determine a balance of an account). In response, Application Framework 117 may send a request to MNO AS 403 to establish a secure connection 160 to Device 110 (410). The MNO AS 403 may then establish secure Device-AS connection 160 (block 412). In an embodiment, secure Device-AS connection 160 may be a mutually authenticated Secure Sockets Layer/Transport Layer Security (SSL/TLS) connection over TCP. MNO AS 403 may then send a request to SP TSM 406 to generate a secure SE-SP TSM connection 170 (415A). In another embodiment, MNO AS 403 may instead send the request to MNO TSM 406 to generate a secure SE-SP TSM connection 170 (415C)

In one embodiment, SP TSM 406 may respond by generating an authentication request for a secure SE-SP TSM connection, and send the authentication request to MNO TSM 404 in mobile network 402 (420A). In this embodiment, upon receiving the authentication request from MNO TSM 404, MNO AS 403 may immediately forward the authentication request for secure SE-SP TSM connection 170 to Application Framework 117 in Device 110 (425A). In an alternative embodiment, the authentication request may be sent directly by the SP TSM 406 to MNO AS 403, thus completely bypassing MNO TSM 404 (420B, represented with a dotted line).

In the alternative embodiment as described above, where the request is sent to MNO TSM 406 (415C), MNO TSM 404 may send the authentication request to AS 403 (420C).

For either embodiment described above, an exemplary format 600 for the authentication request message is described below with respect to FIG. 5. The authentication request may include a "wakeup payload" providing parameters to facilitate the SE 119 in establishing a secure connection 170 with the SP TSM 406.

The authentication request may be sent by MNO AS 403 to Application Framework 117, over the previously established secure Device-AS connection 160 (430). The Application Framework 117 forwards the authentication request to the SE 119 (435). Upon receiving the authentication request, SE 119 establishes a secure SE-SP TSM connection 170 with SP TSM 406 (block 416). Once established, the secure SE-SP TSM connection 170 may support BIP sessions in which the SE 119 and SP TSM 406 may exchange GP commands (440), as described briefly above.

Given the service provider is associated with SP TSM 150, it can create a ciphered/authentication request having a payload with cryptographic keys personalized on a particular service provider security domain. This can provide greater flexibility as any service provider associated with a TSM may provide a request to the SE 119 to establish a secure connection.

Since SMS messaging is not being used as the primary means for forwarding authentication requests, the modem in device 110 and the UICC interface is less likely to become congested, thus avoiding communication "bottlenecks." Also, by avoiding the use of SMS messaging as the primary forwarding approach, embodiments described herein decouple the messaging associated with trusted exchanges from the telecommunications infrastructure, which can further increase reliability.

Additionally, augmenting SMS messaging with secure Device-AS connection 160 increases security by preventing the possibility of SMS Denial of Service (DoS) attacks. This is because secure Device-AS connection 160, which may be secured using SSL/TSL sessions, implicitly filters messages since only authorized application servers may send messages over the secure connection.

Figure 5:
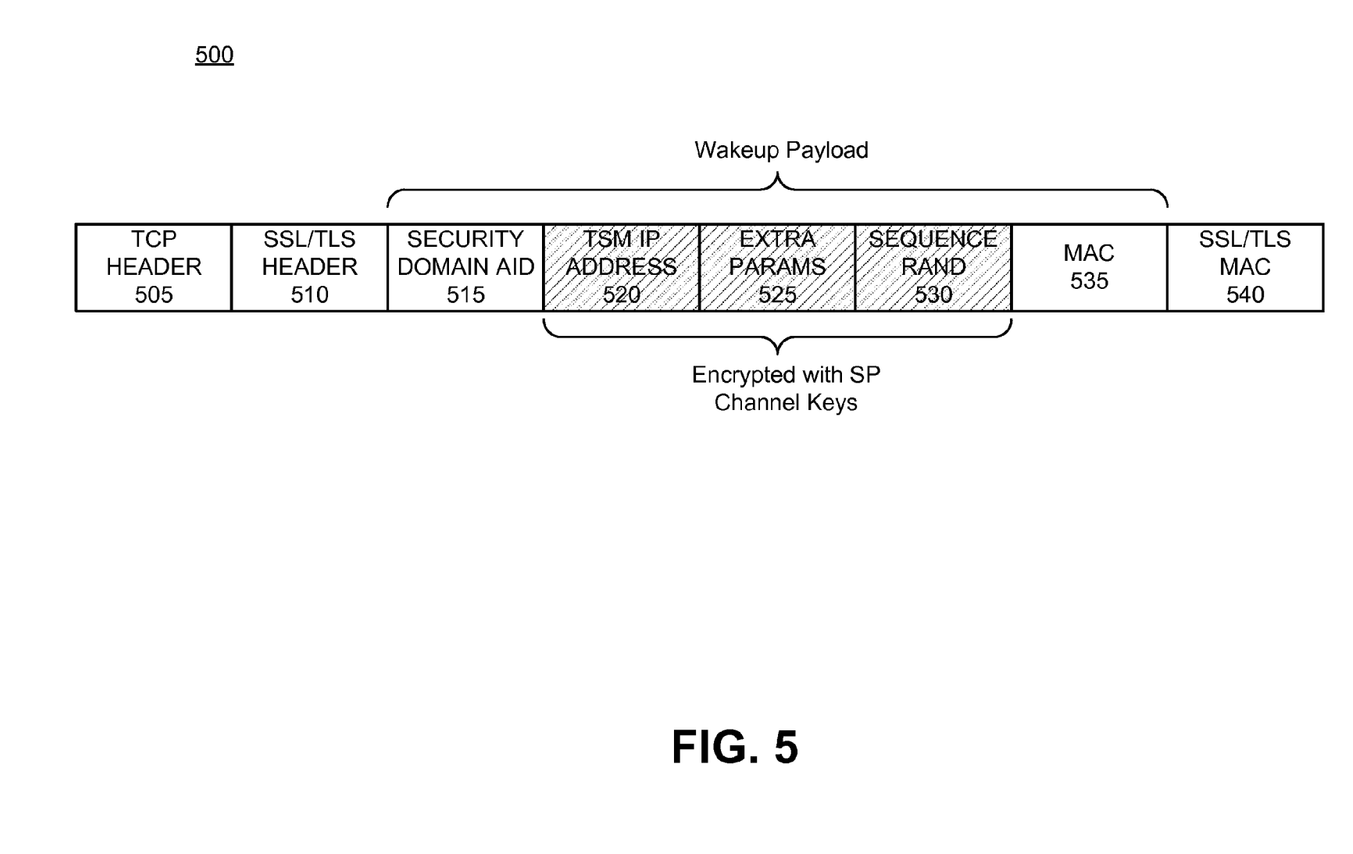
FIG. 5 is a diagram depicting an exemplary format for an authentication request message.

FIG. 5 is a diagram depicting an exemplary format for an authentication request message 500 (i.e., a "wakeup" message). The message include a TCP Header field 505, an SSL/TLS Header field 510, a security domain Application ID (AID) 515, a TSM IP address 520, extra parameters 525, sequence random number 530, Media Access Control (MAC) address 535, and SSL/TLS MAC address 540. The wakeup payload for authentication request message 500 includes security domain AID 515, which may be read by the application framework, and TSM IP address 520, extra parameters 525, and sequence random number 530, which is encrypted so only the appropriate security domain may decipher this information with the SP channel keys. As will be describe below in reference to FIG. 6, the security domain AID should be sent so that it may read by Application Framework 117, so the authentication request message may be routed to the appropriate security domain in the SE 1119.

Figure 6:
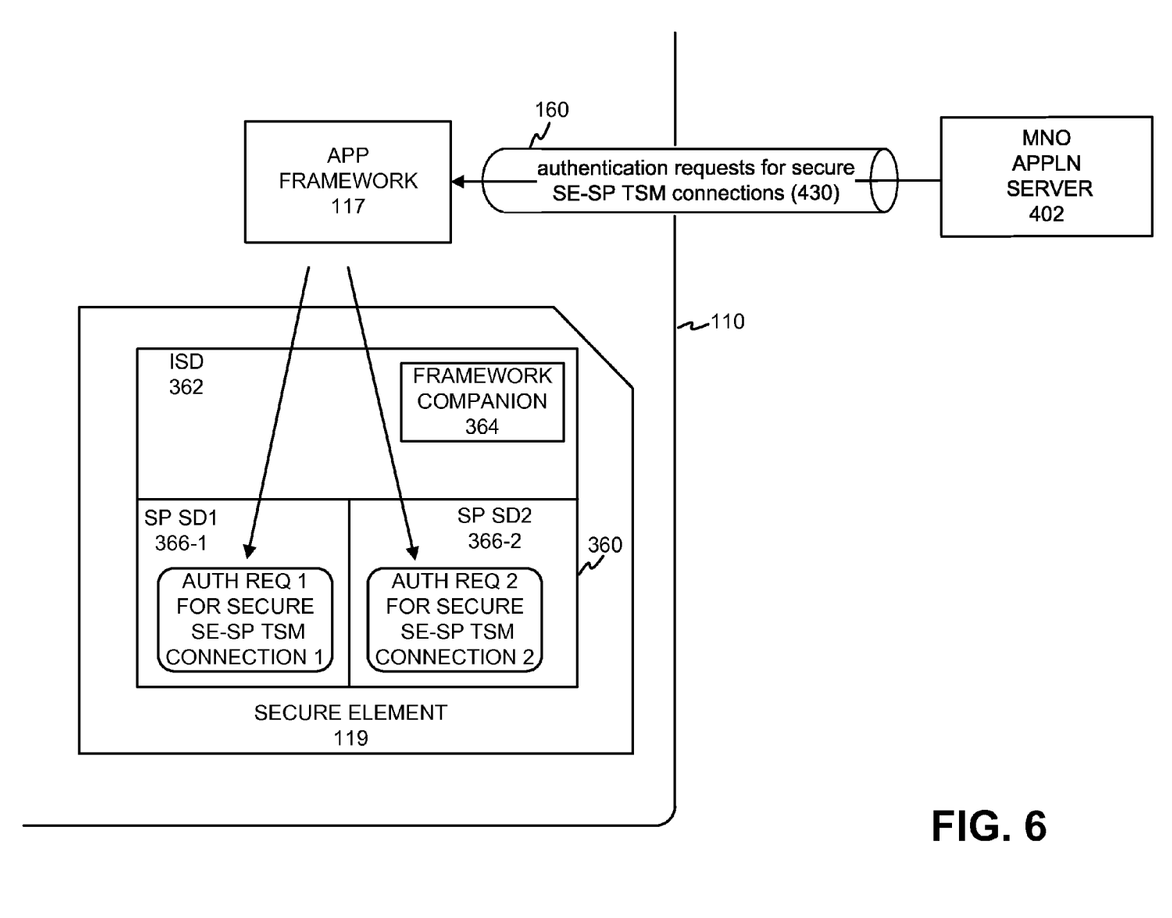
FIG. 6 is a diagram illustrating the routing of authentication request messages into appropriate service provider secure domains within the SE.

FIG. 6 is a diagram illustrating the routing of authentication request messages into appropriate service provider secure domains 366 within the secure memory 360 of SE 119. As described above in reference to FIG. 4, the MNO AS 402 may provide an authentication request for secure SE-SP TSM connection (430) over the previously established secure Device-AS connection 160. The authentication request is received by Application Framework 117 in device 110. Because security domain AID 515 is not encrypted with SP channel keys, Application Framework 117 may read these values, and provide them directly to the appropriate SP SD 366, without having to go through Framework Companion 364 in ISD 362.

Figure 7:
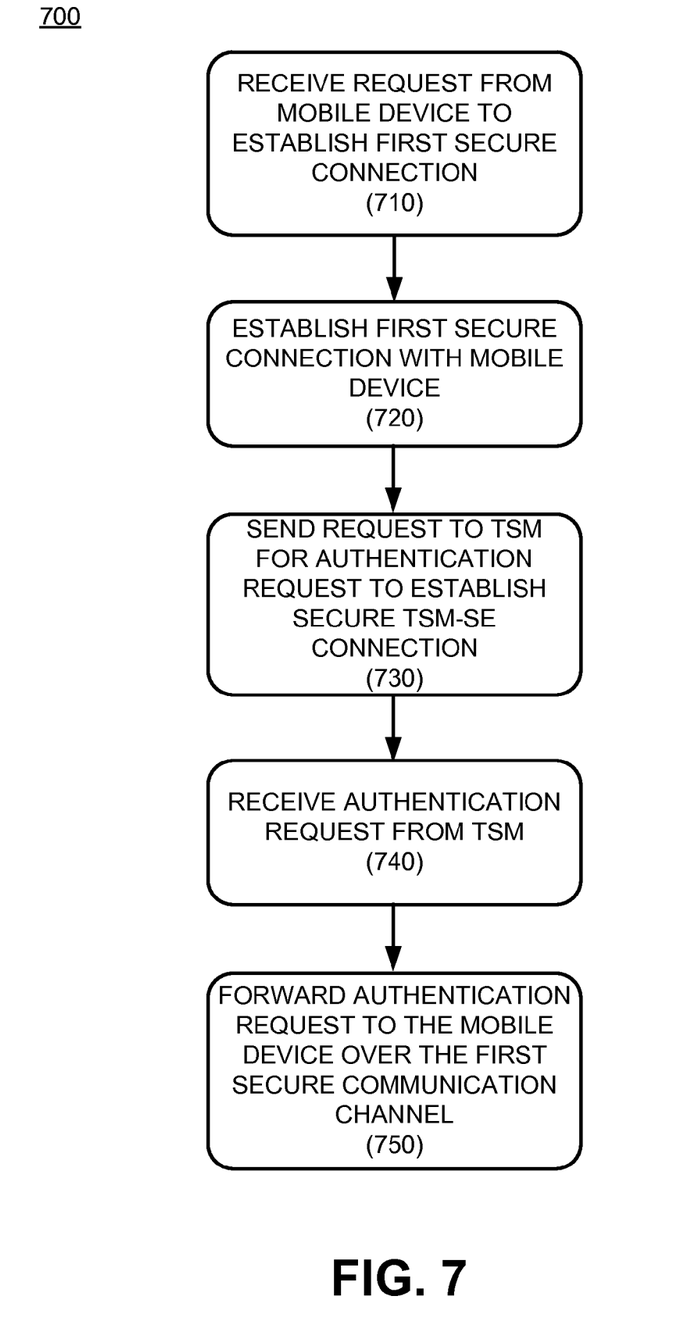
FIG. 7 is a flow chart showing a process for establishing a secure connection between the SE and the TSM which may execute on an Application Server (AS)

FIG. 7 is a flow chart showing an exemplary process 700 for establishing a secure connection between SE 110 and TSM 150 which may execute on MNO Application Server (AS) 403. Process 700 may initially receive a request from Device 110 to establish a first secure connection (block 710). Upon receiving the request, MNO AS 403 may establish the first secure connection with Device 110 in response to the received request (block 720). The first secure connection may be a secure connection between Device 110 and MNO AS 403, which may be an SSL/TSL TCP session. AS 140 may then send a request to SP TSM 406 (block 820). The sent request may instruct the SP TSM 406 to establish a second secure connection between SP TSM 406 and Secure Element (SE)119 (block 730). The MNO AS 403 may receive an authentication request from the SP-TSM 406 to establish the second secure connection (block 740). The second secure connection may be secure SE-SP TSM connection 170. The MNO AS 403 may then forward the authentication request to Device 110 over the first secure connection (block 750).

Figure 8:
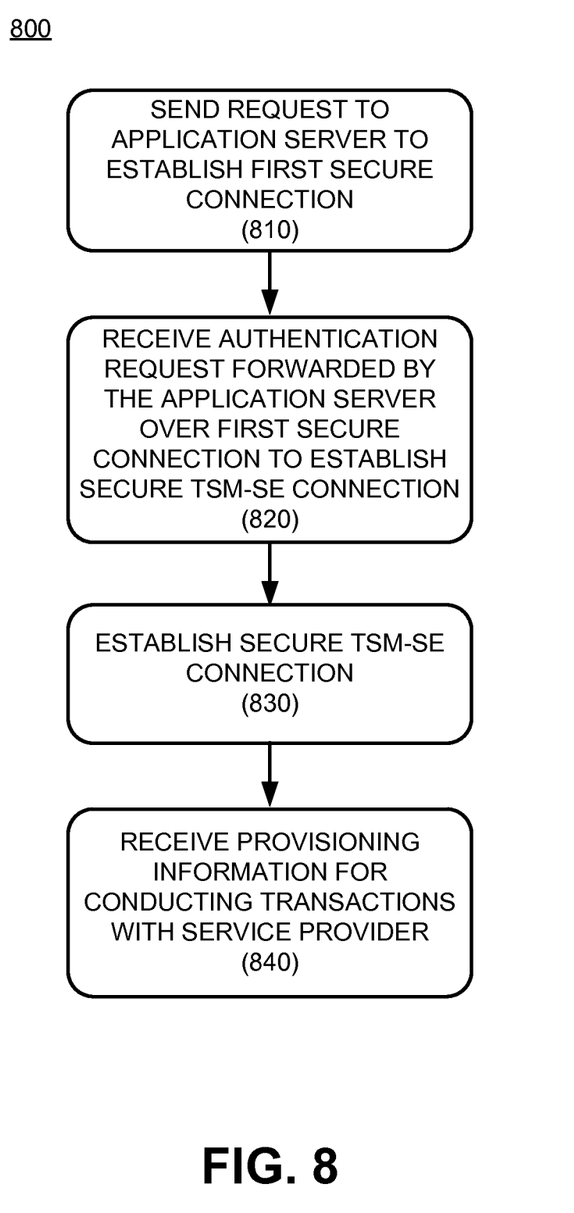
FIG. 8 is a flow chart showing a process for establishing a secure connection between the SE and the TSM which may execute on a device.

FIG. 8 is a flow chart showing an exemplary process 800 for establishing a secure connection between SE 119 and SP TSM 406, which may execute, in parts, on Device 110 and SE 119. Device 110 may send a request to MNO AS 403 to establish a first secure connection (block 810). As noted above the first secure connection may be secure connection between device 110 and MNO AS 403, which may be an SSL/TSL TCP session. Device 110 may then receive an authentication request forwarded by the MNO AS 403 over the first secure connection. The authentication request may be generated by a SP TSM 406 to establish a second secure connection between SE 119 and SP TSM 406 (block 820). Blocks 810 and 820 may be executed on processor 315.

The SE 119 may establish the second secure connection 170 with the SP TSM 406 (block 830). The second secure connection may be secure SE-SP TSM connection 170 which supports BIP session. The SE 119 may then receive provisioning information to conduct transactions with a service provider (block 840). Here, the provisioning information may include secure applications and/or sensitive information (i.e., cryptographic keys), and may be exchange using Global Platform commands. Blocks 830 and 840 may be executed on secure processor 355.

In an alternative embodiment, remote server triggered events based on "piggyback polling" may be used to take advantage of the secure Device-AS connection 160 established by the user using Device 110. Client triggered events described above may be time-sensitive (i.e. customer initiates an action and quickly expects a response), and thus may utilize a fast response. On the other hand, server triggered events are typically not time-sensitive (i.e. applet upgrade to an improved version). Conventional approaches have the MNO AS 403 trigger update sessions using SMS messaging, which are handled in a batch mode. The SP TSMs may update applications in a serial manner, and thus for each application, will go one-by-one and try to connect and perform upgrades for each outdated application. This approach may not be very efficient, and can be subject to the high latency and unreliability associated with SMS messaging.

A more efficient approach is to use "piggyback polling" which takes advantage of the client initiated secure SE-SP TSM connection 170. Each time a user-initiated operation is performed, the SP TSM 406 takes advantage of the active secure SE-SP TSM connection 170 to append any server-pending-operation(s) after provisioning of SE 119. Accordingly, the triggering for this approach is still originally initiated by the client as described in the embodiments presented above, but afterwards the TSM may take advantage of the established connection to the SE for providing its secure memory with application updates and/or new cryptographic keys.

The rationale to add server pending operations after user-initiated operation is to ensure that the user's experience is not adversely affected. However, in some cases, upon a first time activation, the secure application may be downloaded from SP-TSM 406 prior to provisioning SE 119.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5, 8 and 9, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving a request from a device to establish a first secure connection;
   establishing the first secure connection with the device in response to the received request;
   sending a request to a Trusted Service Manager (TSM), wherein the sent request instructs the TSM to establish a second secure connection between the TSM and a secure memory associated with the device;

receiving an authentication request from the TSM to establish the second secure connection; and forwarding the authentication request to the device over the first secure connection.

2. The method of claim 1, wherein the secure memory comprises a secure element (SE) or a Trusted Execution Environment (TEE).

3. The method of claim 2, wherein the received request is initiated by a client application to provision the SE to conduct transactions with a service provider, and further wherein the SE is provisioned to receive at least one of a secure application or secure data.

4. The method of claim 3, wherein the secure application include at least one of a credit card application, a debit card application, a loyalty program application, a ticketing applications, a building access application, or a travel application.

5. The method of claim 2, wherein the first secure connection supports a Transmission Control Protocol/Internet Protocol (TCP/IP) session, and further comprises:

authenticating, mutually with the device, the first secure connection using at least one of Secure Sockets Layer (SSL) or Transport Layer Security (TLS).

6. The method of claim 5, wherein the first secure connection supports TCP/IP as a primary connection for forwarding the authentication request, and supports short message service (SMS) as a secondary connection for forwarding the authentication request when the TCP/IP connection is unavailable.

7. The method of claim 2, wherein the received authentication request is a ciphered authentication request provided once by the TSM.

8. The method of claim 2, wherein the second secure connection supports a Bearer Independent Protocol (BIP) session securely established between the SE and the TSM, and exchanges Global Platform commands over the BIP session.

9. The method of claim 3, wherein the TSM comprises a Mobile Network Operator (MNO) TSM and a Service Provider (SP) TSM, the method further comprising:

providing the sent request to establish the second secure connection between the SP TSM and the SE to the SP TSM, and in response, the SP TSM creates the authentication request and sends the authentication request to the MNO TSM; and receiving the authentication request from the MNO TSM.

10. The method of claim 9, wherein a secure application update is provided by the SP TSM over the second secure connection after the SE has been provisioned.

11. The method of claim 3, wherein the TSM comprises a Mobile Network Operator (MNO) TSM and a Service Provider (SP) TSM, the method further comprising:

providing the sent request to establish the second secure connection between the SP TSM and the SE to the SP TSM, and in response, the SP TSM creates the authentication request and sends the authentication request directly to an MNO Application Server (AS.

12. The method of claim 3, wherein the TSM comprises a Mobile Network Operator (MNO) TSM and a Service Provider (SP) TSM, the method further comprising:

providing the sent request to establish the second secure connection between the MNO TSM and the SE to the MNO TSM, and in response, the MNO TSM creates the authentication request and sends the authentication request directly to an MNO AS.

13. The method of claim 2, wherein the SE includes a secure memory which is partitioned into:

an Issuer Security Domain (ISD) having a dedicated storage area accessible only to a Mobile Network Operator (MNO), and a plurality of Service Provider (SP) security domains, each having a dedicated storage area accessible only to a respective service provider entity, wherein the forwarded authentication request is routed to an appropriate SP security domain based on an application identifier included within the authentication request.

14. An application server, comprising:

a communication interface connected to an external network;

a memory configured to store instructions; and a processor configured to execute the instructions stored in the memory to:

receive a request from a device to establish a first secure connection, establish the first secure connection with the device in response to the received request, send a request to a Trusted Service Manager (TSM), wherein the sent request instructs the TSM to establish a second secure connection between the TSM and a secure memory associated with the device, receive an authentication request from the TSM to establish the second secure connection, and forward the authentication request to the device over the first secure connection.

15. The application server of claim 14, wherein the secure memory comprises a secure element (SE) or a Trusted Execution Environment (TEE).

16. The application server of claim 15, wherein the received request is initiated by a client application to provision the SE to conduct transactions with a service provider, and further wherein the SE is provisioned to receive at least one of a secure application or secure data.

17. The application server of claim 16, wherein the secure application includes at least one of a credit card application, a debit card application, a loyalty program application, a ticketing applications, a building access application, or a travel application.

18. The application server of claim 15, wherein the first secure connection supports a Transmission Control Protocol/Internet Protocol (TCP/IP) session, and the processor is further configured to:

authenticate, mutually with the device, the first secure connection using at least one of Secure Sockets Layer (SSL) or Transport Layer Security (TLS).

19. The application server of claim 15, wherein the received authentication request is a ciphered authentication request provided once by the TSM.

20. The application server of claim 15, wherein the second secure connection supports a Bearer Independent Protocol (BIP) session securely established between the SE and the TSM, and wherein the TSM and the SE exchange Global Platform commands over the BIP session.

21. The application server of claim 15, wherein the TSM comprises a Mobile Network Operator (MNO) TSM and a Service Provider (SP) TSM, and the processor is configured to:

provide the sent request to establish the second secure connection between the SP TSM and the SE to the SP TSM, and in response, the SP TSM creates the authentication request and sends the authentication request to the MNO TSM; and receive the authentication request from the MNO TSM.

22. The application server of claim 21, wherein a secure application update is provided by the SP TSM over the second secure connection after the SE has been provisioned.

23. The application server of claim 15, wherein the SE includes a secure memory which is partitioned into:
- an Issuer Security Domain (ISD) having a dedicated storage area accessible only to a Mobile Network Operator (MNO), and
- a plurality of Service Provider (SP) security domains, each having a dedicated storage area accessible only to a respective service provider entity, wherein the forwarded authentication request is routed to an appropriate SP security domain based on an application identifier included within the authentication request.

24. A non-transitory computer-readable medium comprising instructions, which, when executed by a processor, cause the processor to:
- receive a request from a device to establish a first secure connection;
- establish the first secure connection with the device in response to the received request;
- send a request to a Trusted Service Manager (TSM), wherein the sent request instructs the TSM to establish a second secure connection between the TSM and a secure memory associated with the device;
- receive an authentication request from the TSM to establish the second secure connection; and
- forward the authentication request to the device over the first secure connection.

* * * * *